(12) United States Patent
Marathe

(10) Patent No.: US 7,574,778 B2
(45) Date of Patent: Aug. 18, 2009

(54) INTERLOCKING CORDS

(75) Inventor: Nikhil Marathe, Chicago, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 37 days.

(21) Appl. No.: 11/342,323

(22) Filed: Jan. 27, 2006

(65) Prior Publication Data

US 2007/0175003 A1      Aug. 2, 2007

(51) Int. Cl.
*F16G 11/00* (2006.01)
*F16L 11/22* (2006.01)
*H01B 7/40* (2006.01)
*H02G 3/04* (2006.01)
*F16L 9/19* (2006.01)

(52) U.S. Cl. .................. 24/115 G; 24/16 PB; 138/115; 138/117; 174/113 R; 174/68.1; 285/188; 385/136; 385/137

(58) Field of Classification Search ............... 24/16 PB; 138/115–117; 174/53, 153, 117 F, 68.1, 174/72 TR, 117 FF, 117 R, 36, 110 R, 112, 174/114; 385/101, 136, 137; 439/577
See application file for complete search history.

(56) References Cited

U.S. PATENT DOCUMENTS

| | | | | | |
|---|---|---|---|---|---|
| 2,528,667 | A | * | 11/1950 | Raabe | 174/117 F |
| 2,888,511 | A | * | 5/1959 | Guritz | 174/117 R |
| 3,514,815 | A | * | 6/1970 | Evans | 24/16 R |
| 3,518,727 | A | * | 7/1970 | Eberle et al. | 24/16 PB |
| 3,537,153 | A | * | 11/1970 | Ausnit | 24/702 |
| 3,557,413 | A | * | 1/1971 | Engle | 24/584.1 |
| 3,744,489 | A | * | 7/1973 | Munro | 128/839 |
| 3,875,623 | A | * | 4/1975 | Johnston | 24/580.1 |
| 4,230,898 | A | * | 10/1980 | Emmel | 174/32 |
| 4,329,079 | A | * | 5/1982 | Milding | 403/319 |
| 4,607,746 | A | * | 8/1986 | Stinnette | 206/53 |
| 4,872,242 | A | * | 10/1989 | Allan | 24/16 PB |
| 5,113,036 | A | * | 5/1992 | Arroyo et al. | 385/100 |
| 6,751,382 | B2 | * | 6/2004 | McGarvey | 385/102 |
| 6,909,050 | B1 | * | 6/2005 | Bradford | 174/110 R |
| 7,348,490 | B2 | * | 3/2008 | Sakai | 174/115 |

* cited by examiner

*Primary Examiner*—Robert J Sandy
(74) *Attorney, Agent, or Firm*—Toler Law Group

(57) ABSTRACT

Compositions and methods keep cords, such as electrical connectors for computers and home entertainment systems, tidy and organized with clasp members that run at least partly along the exterior cord surface. Cords may be optionally coupled to other cords in a concatenated arrangement, for example, and cords may be coupled to one or more objects such as a desk or a cabinet. A cord coupled to another cord or to an object may be optionally decoupled from the other cord or from the object.

20 Claims, 6 Drawing Sheets

US 7,574,778 B2

INTERLOCKING CORDS

FIELD OF THE DISCLOSURE

The present disclosure relates to connectors, and in particular, to structures and methods for interlocking cords such as, for example, cords that provide power or signals to the components of a computer system or entertainment system and the like.

BACKGROUND

Electronic equipment that requires electrical power, or that utilizes electronic signals, is ubiquitous. Such equipment often may have any number components that are connected by electrical wires and cords. For example, a computer system often has a monitor to display output, a keyboard for input, speakers, a printer and so forth, all connected by a plurality of wires to a box that houses the CPU (and other circuit boards). Similarly, entertainment systems often include a television monitor, a set-top box, a VCR, a DVD player, a CD player, two or more speakers, and so on. All these components are connected in some arrangement with many wires and cords.

The proliferation of wires and cords in the modern office and home often creates an unsightly mess. Even worse, a chaotic tangle of cords may make it difficult to trouble-shoot and repair an electronic system.

BRIEF DESCRIPTION OF THE DRAWINGS

The detailed description that follows, by way of non-limiting examples of embodiments, makes reference to the noted drawings in which reference numerals represent the same parts throughout the several views of the drawings, and in which.

DETAILED DESCRIPTION

In view of the foregoing, through one or more various aspects, embodiments and/or specific features or sub-components, the present disclosure is thus intended to bring out one or more of the advantages that will be evident from the description. The present disclosure makes reference to one or more specific embodiments by way of illustration and example. It is understood, therefore, that the terminology, examples, drawings and embodiments are merely illustrative and are not intended to limit the scope of the disclosure.

Figure 1:
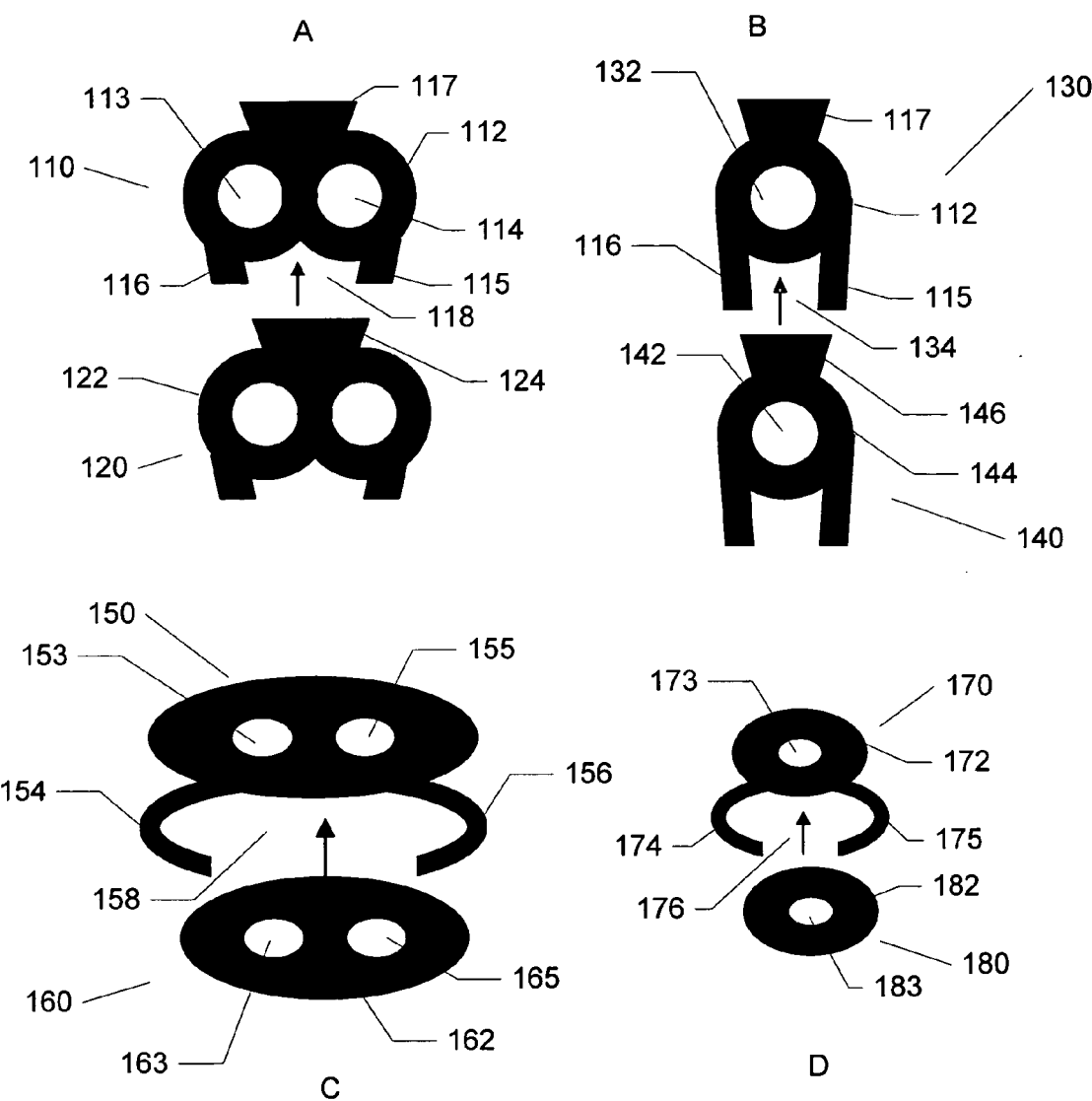
FIG. 1A is a cross-section view drawing of a specific exemplary embodiment of a cord of the present disclosure.
FIG. 1B is a cross-section view drawing of a specific exemplary alternative embodiment of the cord of the FIG. 1A.
FIG. 1C is a cross-section view drawing of a specific exemplary alternative embodiment of a cord of the present disclosure.
FIG. 1D is a cross-section view drawing of a specific exemplary alternative embodiment of the cord of FIG. 1C.

FIG. 1A is a cross-section view drawing of a specific exemplary embodiment of a cord of the present disclosure. Cord 110 may have body 112 housing one or more conduits 113, 114. For example, conduits 113, 114 may house one or more wires or fibers; or may serve as fluid passages. Clasp members 115, 116 extend from body 112 to form female clasp receptacle 118, which runs or extends along the length of cord 110, or at least partly so. Male clasp member 117 also extends outward from body 112 and runs along the length of cord 110, or at least partly so.

Cord 120 may have body 122. Male clasp member 124 extends from body 122 and runs substantially, or at least partly, along the length of cord 110. Male clasp member 124 may matingly couple to female receptacle 118 and cord 110 to form a substantially interlocking connection between cord 110 and cord 120. Cord 120 may be flexible. Cord 120 may include an insulator to house one or more electrical conductors. Clasp member 124 and receptacle 118 may be composed of a resilient material.

FIG. 1B is a cross-section view drawing of a specific exemplary alternative embodiment of the cord of the FIG. 1A. The embodiment of FIG. 1B is similar to that of FIG. 1A except that cords 130, 140 each house a single conduit 132, 142 rather than more than one conduit. Male clasp member 146 extends from body 144 and runs along the length of cord 140, or at least substantially so. As is FIG. 1A, male clasp member 142 couples to female clasp receptacle 134 to form a substantially interlocking connection between cord 130 and cord 140.

Figure 7:
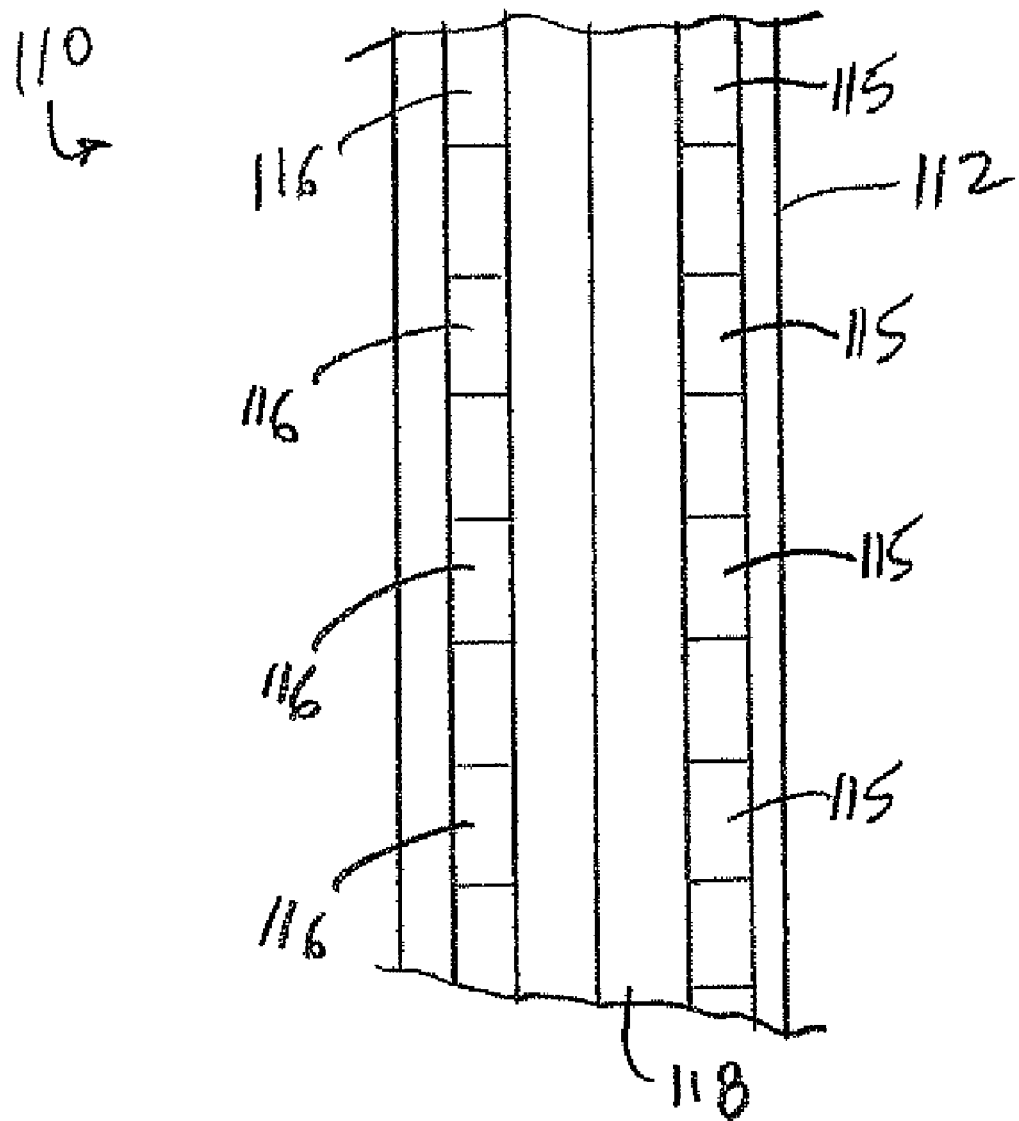
FIG. 7 is a bottom view drawing of a specific exemplary embodiment of the cord of FIG. 1A.

The embodiments of FIGS. 1A and 1B provide examples of cords of the present disclosure in which each cord supplies at least one male connector member and at least one female connector member. Advantageously, such embodiments may facilitate interlocking a plurality of cords to each other in a concatenated arrangement. It will be recognized that male or female clasp members may extend substantially continuously along the outer surface of a cord, or they may extend intermittently along the outer surface (as shown. e.g., in FIG. 7, which is a bottom view drawing of a specific exemplary embodiment of the cord of FIG. 1A), depending on the engineering design choice for a specific embodiment.

FIG. 1C is a cross-section view drawing of a specific exemplary alternative embodiment of a cord of the present disclosure. Cord 150 may have body 152 housing conduits 153, 155. Clasp member 154, 156 may extend from body 152 and extend along the length of cord 150, or at least partly so, forming female clasp receptacle 158. Cord 160 may be adapted to fit in receptacle 158 to couple cord 150 and 160.

FIG. 1D is a cross-section view drawing of a specific exemplary alternative embodiment of the cord of FIG. 1C. The embodiment of FIG. 1D is similar to that of FIG. 1C except that cords 170, 180 each house a single conduit 173, 183 rather than more than one conduit. Clasp members 174, 175 form female receptacle 176 into which may fit cord 180.

It will be evident from the foregoing that, in addition to coupling with another cord, cords 150, 170 may attach to any object that has a member or element around which clasp members 154/156 or 174/175 may grasp. Thus cord 150 or 170 may couple to the edge of a desk top, or to the leg or other support member of a desk, cabinet, table, or other article of furniture. Cord 150 or 170 may couple to a fixture such as a plumbing pipe, or to an architectural element such as a shelf or wall molding.

Figure 2:
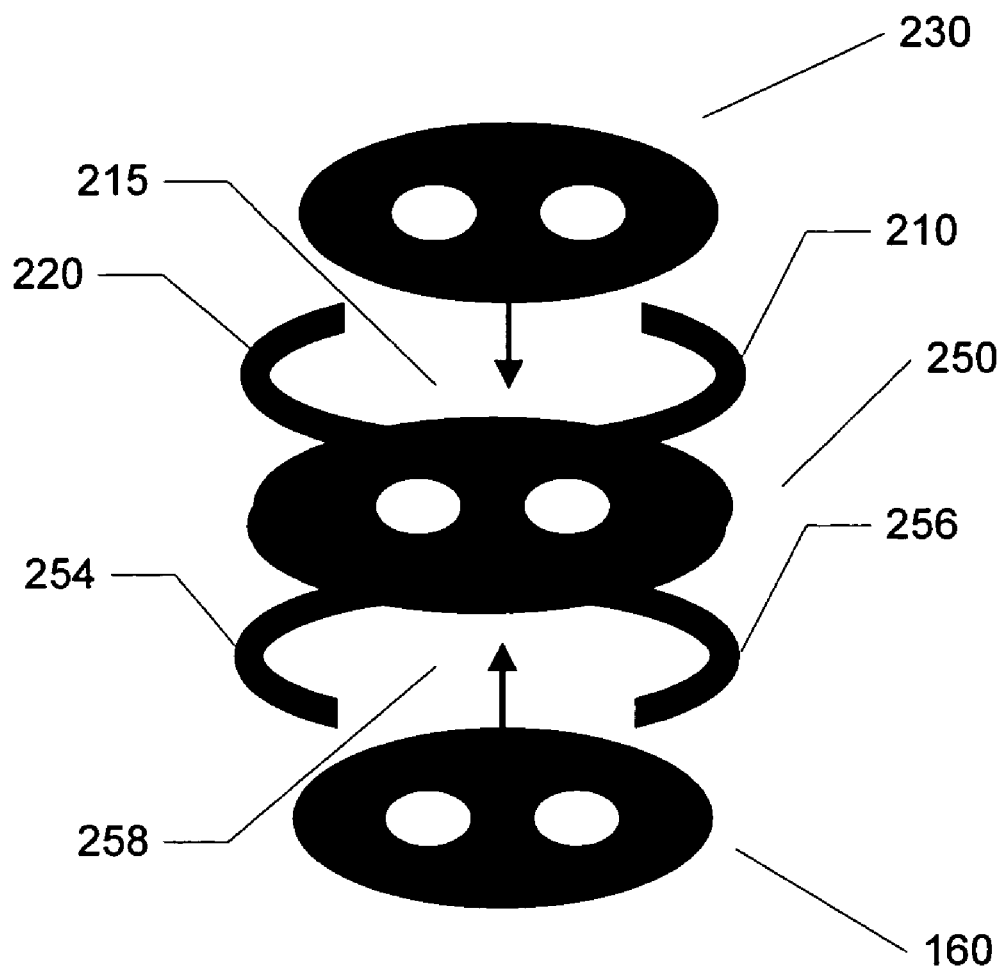
FIG. 2 is a cross-section view drawing of another specific exemplary alternative embodiment of a cord of the present disclosure.

FIG. 2 is a cross-section view drawing of another specific exemplary alternative embodiment of a cord of the present disclosure. Cord 250 resembles cord 150 of FIG. 1C, having clasp members 254, 256 and female receptacle 258 which may correspond to the clasp members 154, 126 and receptacle 158 of FIG. 1C. Additionally, cord 250 may provide clasp members 210, 220 forming receptacle 215, into which may fit cord 230. Accordingly, cord 250 may interlockingly couple to cords 160 and 230.

Figures 3, 4:
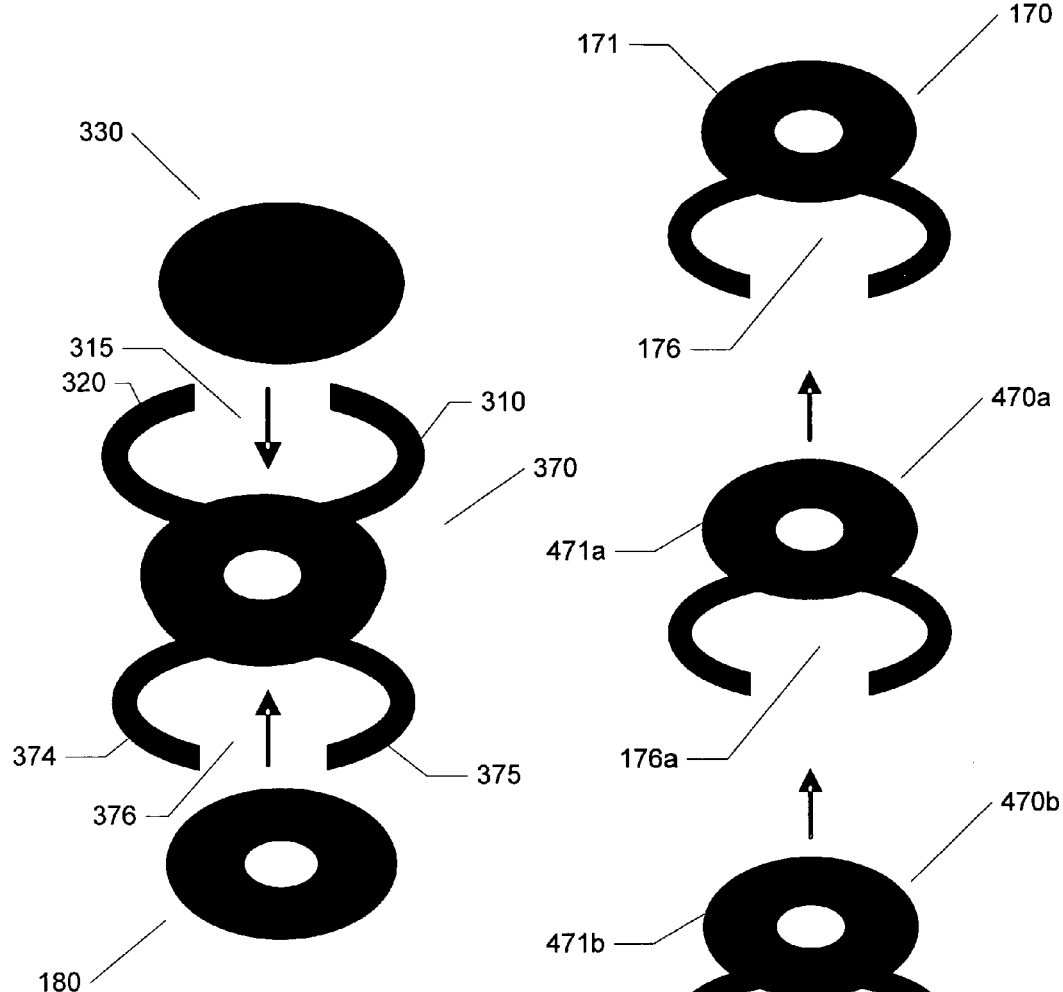
FIG. 3 is a cross-section view drawing of yet another specific alternative exemplary embodiment of a cord of the present disclosure.
FIG. 4 is a cross-section view drawing of still another specific alternative exemplary embodiment of a cord of the present disclosure.

FIG. 3 is a cross-section view drawing of yet another specific alternative exemplary embodiment of a cord of the present disclosure. Cord 370 resembles cord 170 of FIG. 1D, having clasp members 374, 375 and female receptacle 376 which may correspond to the clasp members 174, 175 and receptacle 176 of FIG. 1D. Additionally, cord 370 may provide clasp members 310, 320 forming receptacle 315, into which may fit object 330. Accordingly, cord 370 may interlockingly couple to cord 180 and object 330. Object 330 may be, for example, a plumbing fixture such as a pipe, or may be an element such as a leg or support member of an article of furniture such as a desk or table. Of course, object 330 may also be another cord.

FIG. 4 is a cross-section view drawing of still another specific alternative exemplary embodiment of a cord of the present disclosure. A plurality of cords 170, 470a, 470b, and so forth, may be concatenated together by inserting body portion 471a of cord 470a into receptacle 176 of cord 170; and inserting body portion 476b of cord 470b into receptacle 476a of cord 470a, and so on. The final cord of the series may be coupled to object 410 by inserting object 410 into receptacle 476b, for example. Object 410 may be another cord.

Figure 5:
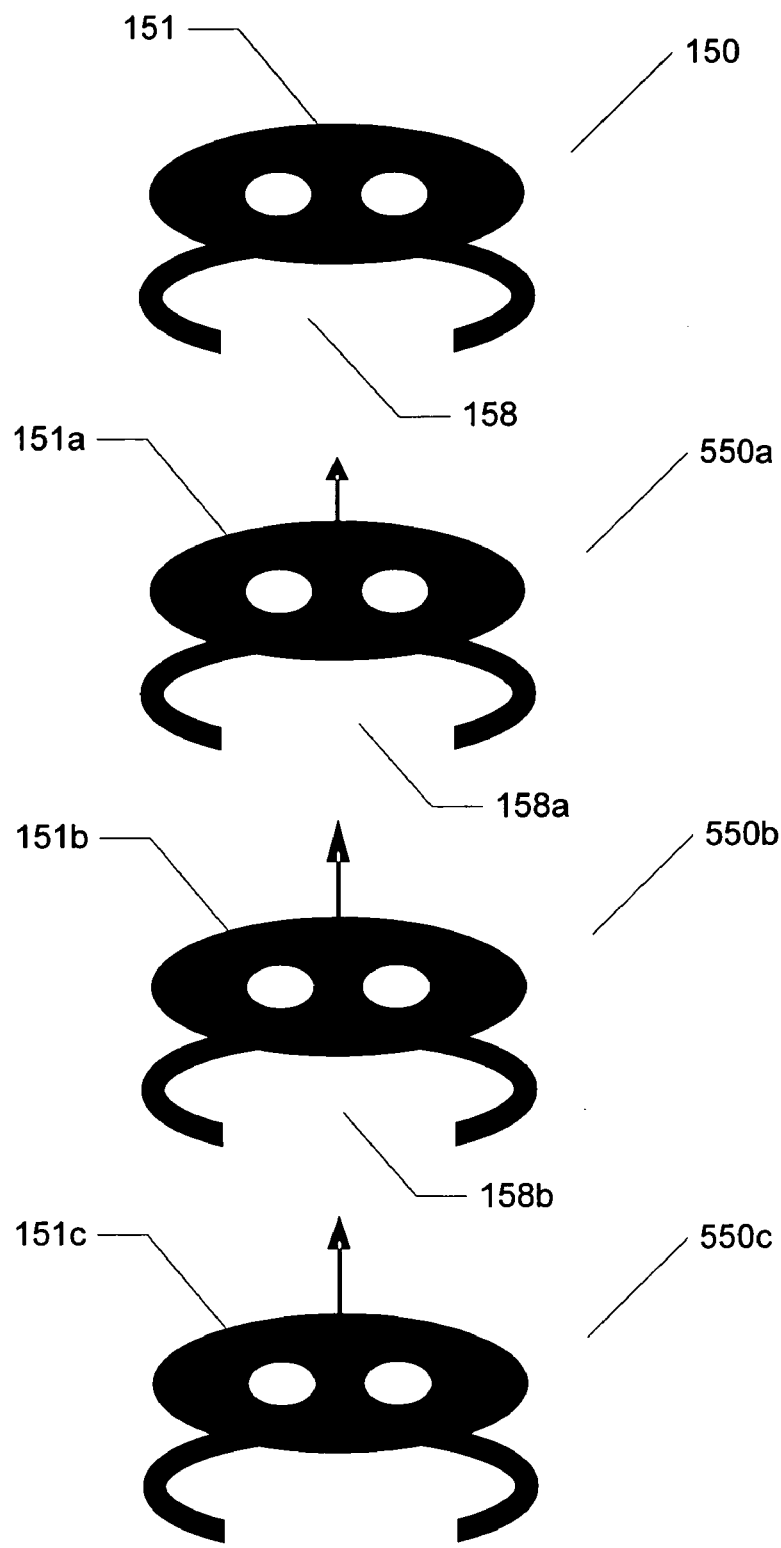
FIG. 5 is a cross-section view drawing of a specific exemplary alternative embodiment of the cord of FIG. 4.

FIG. 5 is a cross-section view drawing of a specific exemplary alternative embodiment of the cord of FIG. 4. A plurality of double-conduit cords 150, 550a, 550b, 550c and so forth, may be concatenated together by inserting body portion 151a of cord 550a into receptacle 158 of cord 150; inserting body portion 551b of cord 550b into receptacle 558a of cord 550a; and inserting body portion 551c into receptacle 558b of cord 550b, and so on. Cord 550c 410 may be an object rather than a cord.

Figure 6:
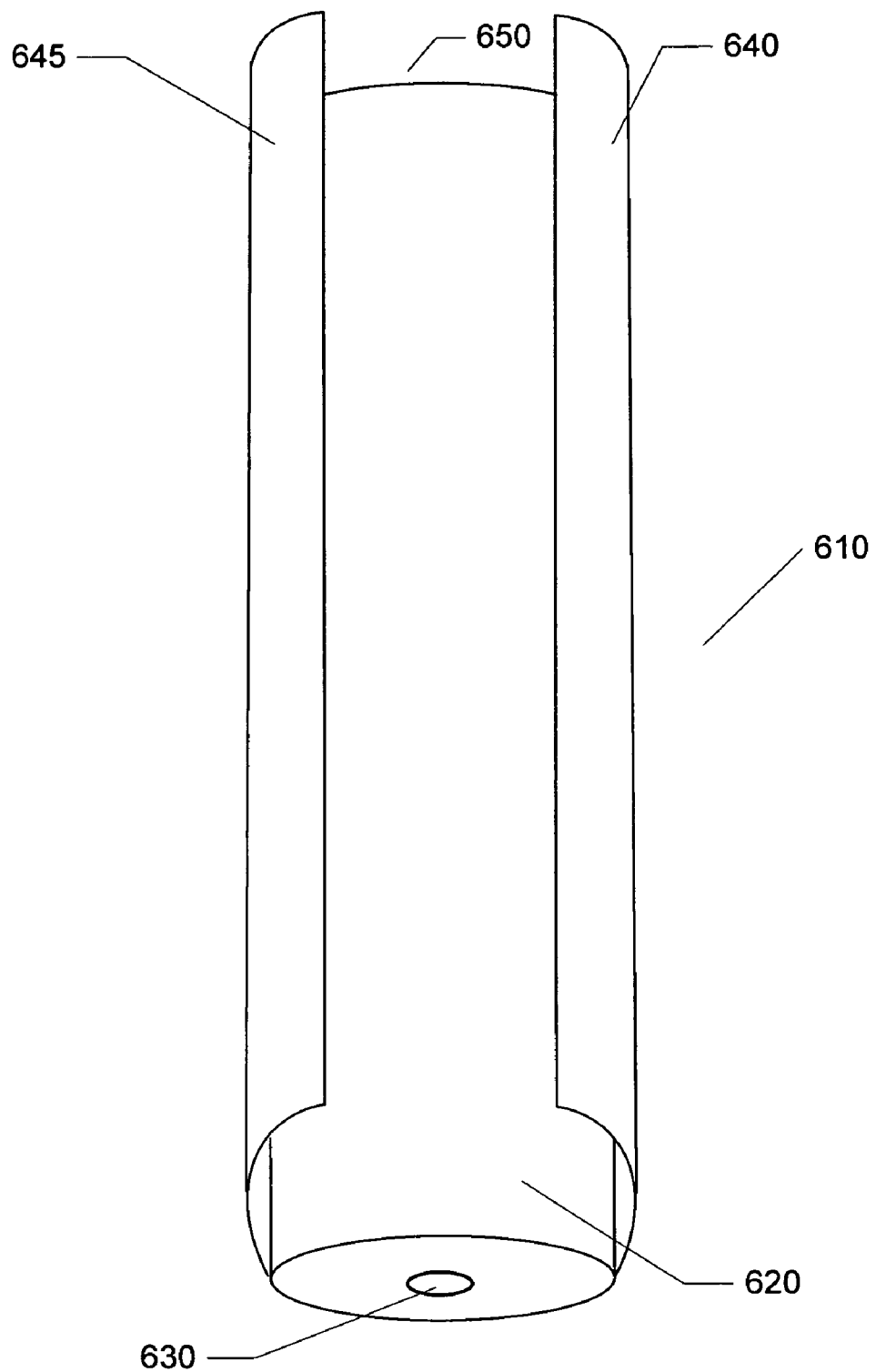
FIG. 6 is an isometric view drawing of a specific exemplary embodiment of a cord of the present disclosure.

FIG. 6 is an isometric view drawing of a specific exemplary embodiment of a cord of the present disclosure. Cord 610 may have body 620, which may have a selected length and which may house conduit 630 to carry wires, fibers or fluids. Clasp members 640 and 645 extend out from body 620 and co-extend at least partially along the length of body 620 to form receptacle 650. Advantageously, a cord 610 of the present disclosure may thus be coupled to one or more other cords, or to one or more objects, in a zip-lock fashion by virtue of receptacle 650. Thus, cord 610 may be selectively coupled or decoupled from one or more other cords or objects along substantially the entire length of cord 610, or selectively along any selected portion of cord 610.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are words of description and illustration, rather than words of limitation. Changes may be made within the purview of the appended claims, as presently stated and as amended, without departing from the scope and spirit of the disclosure in all its aspects. Although description makes reference to particular means, materials and embodiments, the disclosure is not intended to be limited to the particulars disclosed; rather, the disclosure extends to all functionally equivalent technologies, structures, methods and uses such as are within the scope of the appended claims.

I claim:

1. A system of cords, comprising:
   a first cord with a first cord body and a first clasp, wherein the first cord body includes a first plurality of conduits, and wherein the first clasp extends from an outer surface of the first cord body and defines a first receptacle having a longitudinal axis that is substantially parallel to a longitudinal axis of the first cord body; and
   a second cord having a second cord body including a second plurality of conduits,
   wherein the first receptacle has a cross-sectional shape configured to receive the second cord body such that at least two conduits of the second plurality of conduits of the second cord body are positioned in the first receptacle.

2. The system of claim 1, wherein the first cord comprises an electrical insulator.

3. The system of claim 1, further comprising at least one fiber in a conduit of the first plurality of conduits.

4. The system of claim 1, further comprising at least one fiber in a conduit of the second plurality of conduits.

5. The system of claim 1, wherein a conduit of the first plurality of conduits comprises a fluid conduit.

6. The system of claim 1, wherein a conduit of the second plurality of conduits comprises a fluid conduit.

7. The system of claim 1, wherein the second cord includes a second clasp, wherein the second clasp extends from the second cord body and defines a second receptacle, and wherein the second receptacle has a cross-sectional shape configured to receive the first cord body such that at least two conduits of the first plurality of conduits of the first cord body are positioned in the second receptacle when the first cord body is received by the second receptacle.

8. The system of claim 1, wherein the first cord includes a second clasp, wherein the second clasp extends from the first cord body and defines a second receptacle, and wherein the second receptacle has a cross-sectional shape configured to receive the second cord body such that at least two conduits of the second plurality of conduits of the second cord body are positioned in the second receptacle.

9. A system of cords, comprising
a first cord with a first cord body and a first conduit in the first cord body; and
a second cord with a second cord body, a second conduit in the second cord body, a first clasp extending from the second cord body, and a second clasp extending from the second cord body, wherein the first clasp defines a first receptacle with a cross-sectional shape configured to receive the first cord body such that the first conduit is positioned in the first receptacle, and wherein the second clasp defines a second receptacle with a cross-sectional shape configured to receive the first cord body such that the first conduit is positioned in the second receptacle.

10. The system of claim 9, further comprising an object that is not a cord, wherein at least a portion of the object is configured to be positioned in the first receptacle.

11. The system of claim 10, wherein the object is a support member of an article of furniture.

12. The system of claim 10, wherein the object is a plumbing fixture.

13. The system of claim 9, further comprising a third conduit in the second cord body.

14. The system of claim 9, further comprising at least one electrical conductor in the first conduit.

15. The system of claim 9, further comprising at least one electrical conductor in the second conduit.

16. The system of claim 9, wherein the first cord body comprises an insulator.

17. The system of claim 9, further comprising at least one fiber in the first conduit.

18. The system of claim 9, further comprising at least one fiber in the second conduit.

19. The system of claim 9, wherein the first conduit is a fluid passage.

20. The system of claim 9, wherein the second conduit is a fluid passage.

* * * * *